(12) United States Patent
Pohlman

(10) Patent No.: US 6,642,698 B2
(45) Date of Patent: *Nov. 4, 2003

(54) METHOD AND APPARATUS FOR DISTRIBUTING POWER TO AN INTEGRATED CIRCUIT

(75) Inventor: William Pohlman, Phoenix, AZ (US)

(73) Assignee: Primarion, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,524

(22) Filed: Jan. 29, 2001

(65) Prior Publication Data

US 2001/0033151 A1 Oct. 25, 2001

Related U.S. Application Data

(60) Provisional application No. 60/178,461, filed on Jan. 27, 2000.

(51) Int. Cl.⁷ .................................................. G05F 1/40
(52) U.S. Cl. .................. 323/272; 323/282; 323/269; 363/147; 307/24; 307/52
(58) Field of Search .................. 323/271, 272, 323/269, 274, 284, 906, 282, 265, 268; 363/147; 307/16, 18, 24, 31, 52, 82, 125, 126, 131

(56) References Cited

U.S. PATENT DOCUMENTS

| | | | | |
|---|---|---|---|---|
| 4,156,853 A | * | 5/1979 | Peterson | 330/109 |
| 4,375,614 A | | 3/1983 | Steiner | |
| 4,611,162 A | * | 9/1986 | Erratico et al. | 307/75 |
| 5,063,338 A | * | 11/1991 | Capel et al. | 318/138 |
| 5,258,701 A | * | 11/1993 | Pizzi et al. | 323/269 |
| 5,596,265 A | | 1/1997 | Wrathall et al. | |
| 5,629,608 A | * | 5/1997 | Budelman | 323/284 |
| 5,777,383 A | * | 7/1998 | Stager et al. | 257/700 |
| 5,834,925 A | * | 11/1998 | Chesavage | 307/58 |
| 5,889,395 A | | 3/1999 | Lundberg | |
| 5,892,356 A | | 4/1999 | Chuang | |
| 5,898,297 A | | 4/1999 | Bosnyak et al. | |
| 5,909,127 A | | 6/1999 | Pearson et al. | |
| 5,914,873 A | * | 6/1999 | Blish, II | 361/761 |
| 5,938,769 A | * | 8/1999 | Hu | 713/300 |
| 5,945,941 A | * | 8/1999 | Rich et al. | 342/157 |
| 5,973,484 A | * | 10/1999 | Cho | 323/269 |
| 6,009,034 A | * | 12/1999 | Manning | 365/226 |
| 6,028,417 A | * | 2/2000 | Ang et al. | 323/209 |
| 6,031,362 A | * | 2/2000 | Bradley | 323/269 |
| 6,130,526 A | * | 10/2000 | Yang et al. | 323/272 |
| 6,144,194 A | * | 11/2000 | Varga | 323/285 |
| 6,157,552 A | * | 12/2000 | Kern et al. | 307/105 |
| 6,359,783 B1 | * | 3/2002 | Noble | 361/704 |
| RE37,708 E | * | 5/2002 | Danstrom | 323/284 |
| 6,396,167 B1 | * | 5/2002 | Simburger et al. | 307/43 |
| 6,429,630 B2 | * | 8/2002 | Pohlman et al. | 323/272 |

* cited by examiner

Primary Examiner—Adolf D. Berhane
Assistant Examiner—Gary L. Laxton
(74) Attorney, Agent, or Firm—Snell & Wilmer, L.L.P

(57) ABSTRACT

An apparatus for providing regulated power to a microelectronic device is disclosed. The apparatus includes an array of power regulators that are coupled together and which are configured to provide power to various portions of the microelectronic device. The array includes filters to determine a frequency of power demanded by the device and transistors configured to provide power in the demanded frequency range.

25 Claims, 2 Drawing Sheets

METHOD AND APPARATUS FOR DISTRIBUTING POWER TO AN INTEGRATED CIRCUIT

CROSS REFERENCE TO RELATED APPLICATIONS

This application claims priority to U.S. Provisional Application Ser. No. 60/178,461, filed Jan. 27, 2000, entitled "Method and Apparatus for Distributing Power to an Integrated Circuit."

TECHNICAL FIELD

The present invention generally relates to microelectronic devices. More particularly, the present invention relates to apparatus and techniques for distributing power to microelectronic devices.

BACKGROUND OF THE INVENTION

Regulators are often employed to provide a desired, regulated power to microelectronic devices such as microprocessors. For example, switching regulators such as buck regulators are often used to step down a voltage (e.g., from about 3.3 volts) and provide suitable power to a microprocessor (e.g., about 10–30 amps at about 2–3 volts).

To increase speed and reduce costs associated with microprocessors, microprocessor gate counts and integration generally increase, while the size of the microprocessor per gate generally decreases. As gate counts, speed, and integration of microprocessors increase, supplying requisite power to microprocessors becomes increasingly problematic. For example, a current required to drive the processors generally increases as the number of processor gates increases. Moreover, as the gate count increases per surface area of a processor, the operating voltage of the processor must typically decrease to, among other reasons, reduce overall power consumption of the processor. Furthermore, as the microprocessor speed increases, the microprocessor demands the higher current at faster speeds. In addition, because one regulator generally supplies power to the entire microprocessor, the single regulator must supply the higher current power at higher speeds to the entire microprocessor.

Although buck regulators are generally suitable for controlling power to some microprocessors, such regulators are not well suited to supply relatively high current (e.g., greater than about 30 amps) at relatively high speed (e.g., greater than about 500 MHz.). One reason that buck regulators have difficulty supplying high current at high speed to the microprocessor is that the current supplied from the regulator to the processor has to travel a conductive path that generally includes a portion of a printed circuit board that couples the processor to the regulator. The relatively long conductive path between the processor and the regulator slows a speed at which the regulator is able to supply current to the processor. In addition, as microprocessor speed and current demands increase, the buck controller simply cannot provide the desired amount of current within the desired amount of time. Thus, as microprocessor gate counts and clock speeds increase, improved methods and apparatus for supplying high current at high speed and low voltage are desired.

SUMMARY OF THE INVENTION

The present invention provides improved apparatus and techniques for regulating power to a microelectronic device. More particularly, the invention provides improved devices and methods suitable for supplying electronic devices with relatively high, regulated current at relatively high speed.

The way in which the present invention addresses the deficiencies of now-known regulators and power supply systems is discussed in greater detail below. However, in general, the present invention provides an array of power regulators that provides power to a single microelectronic device.

In accordance with one exemplary embodiment of the present invention, an array of regulators is configured to provide power to a microprocessor. In accordance with one aspect of this embodiment, the array is formed as an integrated circuit on a semiconductor substrate. In accordance with a further aspect of this embodiment, the circuit is coupled to the microprocessor through a relatively short conductive path (e.g., by coupling the circuit to the device via bump interconnects). In accordance with yet a further aspect of this embodiment, the array circuit is formed on a compound semiconductor substrate such as a silicon germanium (SiGe) substrate to facilitate faster current supply to the device.

In accordance with a further exemplary embodiment of the present invention, a pass band filter is coupled to a regulator within the array. In accordance with one aspect of this embodiment, the array is capable of providing various amounts of current at various frequencies to portions of a microelectronic device. This allows portions of the array to rapidly respond to high frequency power demands of a potion of a microprocessor and supply relatively high current to other portions of the microprocessor which have a lower frequency power demand.

DETAILED DESCRIPTION OF EXEMPLARY EMBODIMENTS

The present invention generally relates to microelectronic power regulators. More particularly, the invention relates to regulators suitable for providing high current, relatively low speed and low current, relatively high speed power to microelectronic devices and to electronic systems including the regulators. Although the present invention may be used to provide power to a variety of microelectronic devices, the invention is conveniently described below in connection with providing power to microprocessors.

Figure 1:
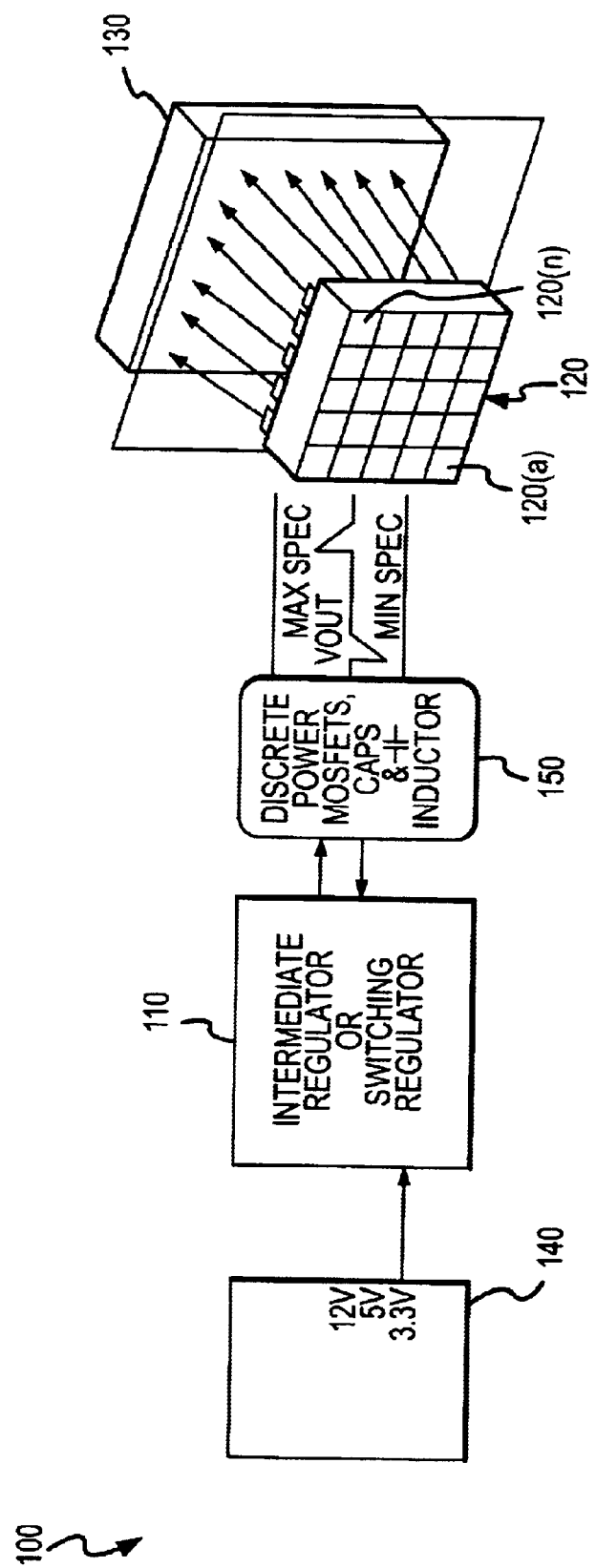
FIG. 1 illustrates a power regulation system in accordance with an exemplary embodiment of the present invention.

An exemplary power supply system 100 in accordance with the present invention is schematically illustrated in FIG. 1. As illustrated, system 100 includes an intermediate regulator 110, a regulator array 120, including regulators 120(a)–120(n), and a microprocessor 130. System 100 may also suitably include a power converter 140 and one or more discrete electronic components, collectively represented as components 150.

In general, system 100 is configured to provide relatively high current (e.g., 30 to more than 100 amps) at relatively low voltage (e.g., down to about 1 volt or less) with a relatively short response time. As discussed in greater detail below, in accordance with the present invention, system 100 provides the high current power to microprocessor 130 by distributing the power regulating duty to a plurality of regulators (e.g. regulator 110 and/or regulators 120(a)–120(n)). In accordance with the present invention, the power regulation duties are distributed based on a frequency and/or a current demand from the microprocessor.

Converter 140 of system 100 is generally configured to convert alternating current (AC) power obtained from a typical AC power outlet to direct current (DC) power to, for example, provide suitable DC power for a motherboard of a computer. For example, in accordance with one exemplary embodiment of the present invention, converter 140 is configured to convert 110 volt AC power to about 3.3 volts to about 15 volts DC power at about 1 amp to about 20 amps. In accordance with one aspect of this embodiment, converter 140 includes multiple DC power outputs—e.g., about 12 volts at about 1 amp, about 5 volts at about 5 amps, at about 3.3 volts at about 30 amps to supply the power to, for example, various types of microelectronic devices which may be coupled to the motherboard. In accordance with alternative embodiments of the present invention, converter 140 may include any number of DC power outputs, and the amount of power associated with each output may vary in accordance with a type of device coupled to the output of converter 140.

Intermediate regulator 110 is a DC-to-DC converter, which is designed to convert output from converter 140 to higher current, lower voltage power. In accordance with one exemplary embodiment of the present invention, regulator 110 receives power (e.g. 3.3 volts at 30 amps) from converter 140 and converts the power to about 1.15 volts at about 100 amps. Regulator 110 may be a linear regulator, a switching regulator, or any other suitable type of power controller; however, in accordance with one exemplary embodiment of the present invention, regulator 110 comprises a switching regulator such as a buck regulator.

System 100 may also optionally include discrete components 150 to facilitate rapid response power transfer from regulator 110 to array 120. In particular, components 150 may include capacitors to store an appropriate charge and discharge the energy as array 120 calls for power from regulator 110.

Regulator 120 is generally configured to provide high current (e.g., up to 100 amps or more) power at a relatively low response time (e.g., at speeds of 500 MHz and above) to microprocessor 130. In accordance with an exemplary embodiment of the present invention, array 120 includes one or more power regulators (e.g., regulators 120(a)–120(n)) configured to transform power received from regulator 110 and/or components 150 and convert the power into higher current, lower voltage power suitable for microprocessor 130.

Figure 2:
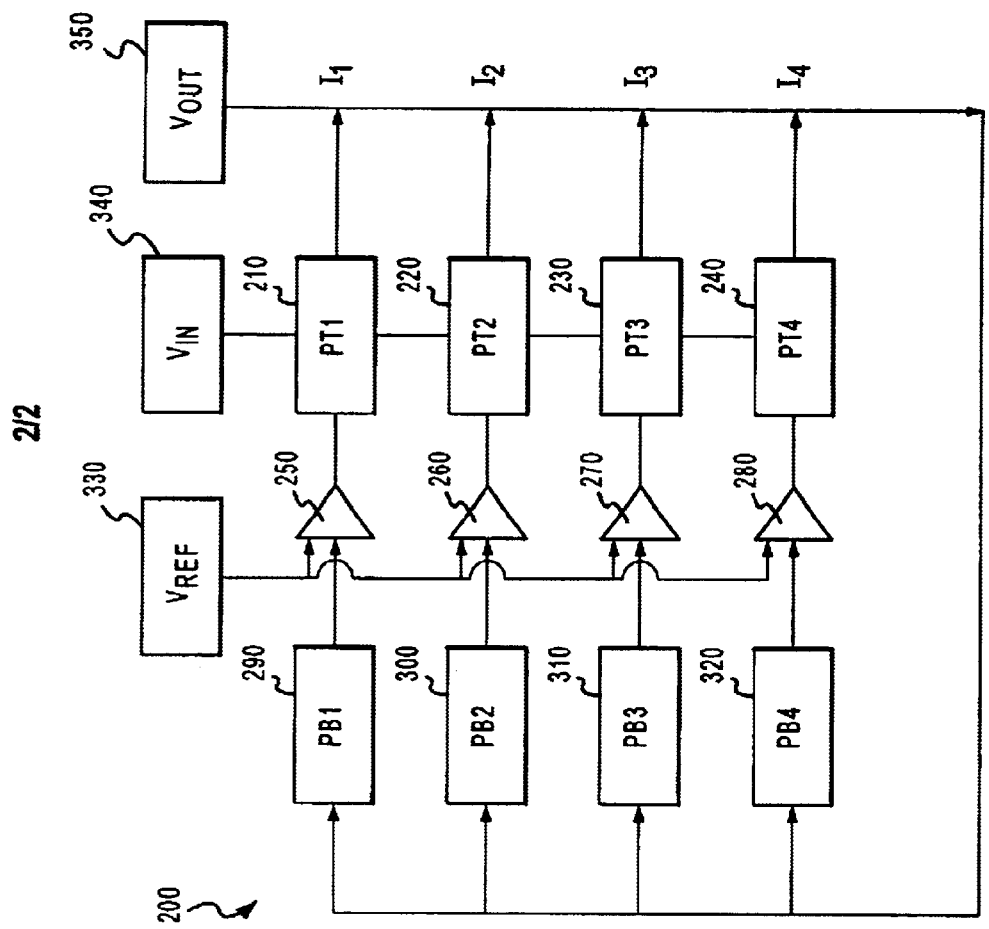
FIG. 2 is a schematic illustration of a regulator array including pass band filters in accordance with the present invention.

FIG. 2 schematically illustrates a portion of a regulator array 200 (e.g., a portion of regulator 120) in accordance with the present invention. Regulator array 200 suitably includes transistors 210, 220, 230, and 240; error amplifiers 250, 260, 270, and 280; filters 290, 300, 310, and 320; a voltage reference source 330, an input voltage source 340, and an output voltage terminal 350. Although array portion 200 is illustrated with a set number of components, array 200 may suitably include any number of filters, amplifiers, and transistors in accordance with the present invention.

Generally, array 200 is configured to provide power to a microprocessor, wherein the supplied power has a voltage of $V_{out}$ and a current that is equal to a sum of the output currents from transistors 210–240. In the example illustrated in FIG. 2, $I_{out}=I_1+I_2+I_3+I_4$. As discussed in greater detail below, each current output $I_1$–$I_4$ may be a different current that is transmitted over a different frequency range; for example, $I_1$, may be at 2 amps and transmitted at 0–800 MHz, while $I_2$ is at 100 milliamps and transmitted over of frequency range of 800 MHz–1 GHz. This configuration of array 200 allows, for example, array 200 to provide relatively high current at low frequencies and relatively low current at relatively high frequencies. Thus, array 200 is suitable for providing high speed, relatively low current to portions of a microprocessor and relatively high current at relatively low speed to other portions of the microprocessor.

In operation, pass band filters 290–320 receive a signal from a microprocessor (e.g., microprocessor 130) indicating that power is required. If the frequency of the power demand falls within a frequency range associated with one of filters 290–320, then that filter passes the signal onto a respective error amplifier 250–280. The respective error amplifier then amplifies the signal and transmits the signal to one of transistors 210–240, which then transmits the signal or power to a portion of the microprocessor.

Transistors 210–240 may include any transistor suitable for regulating power. In accordance with an exemplary embodiment of the present invention, transistors 210–240 include linear or pass band transistors. Similarly, filters 290–320 may include any type of filter that can distinguish and separate power demands of various frequencies. In accordance with one embodiment of the invention, filters 290–320 include pass band filters.

To increase a response speed of array 200, array 200 is preferably formed on a semiconductive substrate having relatively high electron mobility—for example, a compound semiconductor substrate or film—e.g., a silicon germanium substrate or film.

To determine a number of filters and frequency ranges associated with each filter, a spectrum analysis may be performed on a microprocessor. This allows optimization of array 120 to a particular microprocessor design.

Although the present invention is set forth herein in the context of the appended drawing figures, it should be appreciated that the invention is not limited to the specific form shown. For example, although the illustrated array includes a filter associated with each transistor, a filter need not be associated with each and every transistor within an array. Various other modifications, variations, and enhancements in the design and arrangement of the method and apparatus set forth herein may be made without departing from the spirit and scope of the present invention as set forth in the appended claims.

I claim:

1. A microelectronic power supply for providing regulated power to a microelectronic device comprising:
    an array of power regulators coupled together;
    wherein at least two of said power regulators in said array are configured to provide power at different current levels; and,
    wherein at least one of said power regulators is configured to respond to microelectronic device power demands at a rate greater than about 500 MHz.

2. The microelectronic power supply of claim 1, wherein at least two of said power regulators in said array are configured to provide power at different frequencies.

3. The microelectronic power supply of claim 1, wherein said array includes solder bump interconnects to couple to the microelectronic device.

4. The microelectronic power supply of claim 1, wherein said array is formed using compound semiconductor material.

5. The microelectronic power supply of claim 4, wherein said compound semiconductor material comprises SiGe.

6. The microelectronic power supply of claim 1, wherein said array comprises a plurality of transistors, wherein at least one of said transistors is coupled to a filter.

7. The microelectronic power, supply of claim 6, wherein at least one of said transistors comprises a pass band transistor.

8. The microelectronic power supply of claim 6, wherein said filter comprises a pass band filter.

9. A microelectronic power supply system comprising an array of power regulators coupled together, therein at least one regulator is coupled to a filter, wherein at least one of said regulators is configured to respond to microelectronic device power demands at a rate greater than about 500 MHz, and wherein at least two of said power regulators in said array are configured to respond to current demands at different rates.

10. The microelectronic power supply system of claim 9, further comprising a power converter.

11. The microelectronic power supply system of claim 9, further comprising electronic components coupled to said array of power regulators.

12. The microelectronic power supply system of claim 11, wherein said electronic components include capacitors.

13. The microelectronic power supply system of claim 9, wherein said array is formed using compound semiconductor material.

14. The microelectronic power supply system of claim 9, further comprising an intermediate regulator coupled to said array.

15. The microelectronic power supply system of claim 14, wherein said intermediate regulator is a switching power regulator.

16. A microelectronic power supply for providing regulated power to a microelectronic device comprising:

an array of power regulators coupled together;

wherein at least two of said power regulators in said array are configured to respond to current demands at different rates; and, wherein at least one of paid power regulators is configured to provide high current power with a response time of at least about 500 MHz.

17. The microelectronic power supply of claim 16 wherein a first power regulator is configured to respond to power at a rate of about 0–800 MHz and wherein a second power regulator is configured to respond to power events at a rate of about 800 MHz–1 GHz.

18. The microelectronic power supply of claim 16 wherein said array provides relatively high current at low frequencies and relatively low current at relatively high frequencies.

19. The microelectronic power supply of claim 16, wherein said array includes solder bumps to couple to the microelectronic device.

20. The microelectronic power supply of claim 16, wherein said array is formed using compound semiconductor material.

21. The microelectronic power supply of claim 20, wherein said compound semiconductor material is SiGe.

22. The microelectronic power supply of claim 16, wherein said array comprises a plurality of transistors, wherein at least one of said transistors is coupled to a filter.

23. The microelectronic power supply of claim 22, wherein at least one of said transistors comprises a pass band transistor.

24. The microelectronic power supply of claim 23, wherein said filter comprises a pass band filter.

25. A microelectronic power supply for providing regulated power to a microelectronic device comprising:

an array of power regulators coupled to a first surface of a substrate;

wherein at least two of said power regulators in said array are configured to provide power at different current levels;

wherein at least one of said power regulators is configured to respond to microelectronic device power demands at a rate greater than about 500 MHz; and, wherein the microelectronic device is coupled to a second surface of the substrate.

* * * * *